US007221944B2

(12) United States Patent
Kanerva

(10) Patent No.: US 7,221,944 B2
(45) Date of Patent: May 22, 2007

(54) PRIORITIZED SENDING OF DATA

(75) Inventor: Mikko Kanerva, Helsinki (FI)

(73) Assignee: Nokia Corporation, Espoo (FI)

( * ) Notice: Subject to any disclaimer, the term of this patent is extended or adjusted under 35 U.S.C. 154(b) by 503 days.

(21) Appl. No.: 10/041,715

(22) Filed: Jan. 8, 2002

(65) Prior Publication Data

US 2002/0094815 A1 Jul. 18, 2002

Related U.S. Application Data

(63) Continuation of application No. PCT/EP99/04981, filed on Jul. 14, 1999.

(51) Int. Cl.
*H04Q 7/20* (2006.01)

(52) U.S. Cl. .............. 455/452.1; 455/450; 455/452.2; 455/453

(58) Field of Classification Search ........ 455/436–444, 455/450–453, 435.3, 466, 512, 446, 433, 455/456.1
See application file for complete search history.

(56) References Cited

U.S. PATENT DOCUMENTS 5,497,504 A * 3/1996 Acampora et al. .......... 455/436

| | | | |
|---|---|---|---|
| 6,125,278 A * | 9/2000 | Wieczorek et al. | 455/437 |
| 6,400,954 B1 * | 6/2002 | Khan et al. | 455/450 |
| 6,526,282 B1 * | 2/2003 | Kadoshima et al. | 455/453 |

FOREIGN PATENT DOCUMENTS

| WO | 9835514 | 8/1998 |
|---|---|---|
| WO | 9845966 | 10/1998 |

* cited by examiner

*Primary Examiner*—Edward F. Urban
*Assistant Examiner*—Raymond S. Dean
(74) *Attorney, Agent, or Firm*—Alfred A. Fressola; Ware, Fressola, Van Der Sluys & Adolphson LLP

(57) ABSTRACT

A method and a system for communicating data in a telecommunication network (3) in which the available capacity is not uniformly distributed is disclosed. The system comprises a controller (2) for tracking the locations of a mobile station (1) moving in the telecommunication network (3), and for scheduling the data communication to or from the mobile station in accordance with the available capacity of the network.

31 Claims, 3 Drawing Sheets

PRIORITIZED SENDING OF DATA

CROSS-REFERENCE TO RELATED APPLICATION

This application is a continuation of International Application PCT/EP99/04981 having an international filing date of Jul. 14, 1999 and from which priority is claimed under all applicable sections of Title 35 of the United States Code including, but not limited to, Sections 120, 363 and 365(c).

FIELD OF THE INVENTION

The present invention relates to a method and a system for communicating data in a cellular telecommunication network.

BACKGROUND OF THE INVENTION

According to cellular network systems, the entire area of coverage is divided into contiguous or overlapping cells having a size up to several kilometers depending on the anticipated traffic load. Each cell comprises a base station with a certain communication capacity or throughput capacity. Neighbouring cells use different frequencies, although cells that are further apart can use the same frequencies as they are not hindered by each other due to the relatively low power of all the transmitting stations used. Alternatively, some radio technologies like CDMA (Code Division Multiple Access) systems can use the same frequency in neighbouring or overlapping cells.

Different types of cells can be handled in the same geographical environment in a limited bandwidth. For example, there may be two different overlapping cell layers in one geographical region, which layers consist of micro cells and macro cells, respectively.

When a mobile station (MS) moves in such a cellular network while communicating via this network, handovers between cells in an area of the network have to take place. Moreover, while moving in the cellular network, the mobile station may move to a congested area consisting of at least one congested cell. In congested areas, however, the Quality of Service (QoS) offered to the mobile station may have to be reduced.

The WO 98 35514 A relates to a communication system which has the capability to transmit at high data rates and the ability to allocate the forward link resource to the users whenever requested, based on the availability of the resource. According this system, since voice communication cannot tolerate extensive delay, priority should be given to transmission of voice data over transmission of any data traffic. Moreover, since the amount of voice activity at any given moment is unpredictable, in the WO 98 35514 A it is suggested to continuously monitor the forward link and to dynamically adjust the data transmission so that the forward link capacity is not exceeded. Since the user may be in soft handoff between multiple cells, it is proposed to assign the data transmission based on the forward link capacity of each of the cells participating in the soft handoff.

Furthermore, the WO 98 45966 A is concerned with a method and an apparatus for scheduling data transmissions, in which a channel scheduler determines the maximum scheduling transmission rate for high speed data transmission. The maximum scheduled transmission rate is assigned at each scheduling period according to the availability of the reverse link capacity.

SUMMARY OF THE INVENTION

It is an object of the present invention to enable reliable and optimized data communication in telecommunication networks having congested areas.

According to a first aspect of the present invention, this object is achieved by a method of communicating data in a cellular telecommunication network (3) in which the available capacity is not uniformly distributed, comprising the steps of:

tracking (S1) the locations of a mobile station (1) moving in the cellular telecommunication network (3); and scheduling (S4) the data communication to or from the mobile station (1) in accordance with the available capacity of the network at the current and future locations of the mobile station, wherein the data communication to or from the mobile station at the current location of the mobile station is prioritized in the scheduling step when the available capacity at future locations is less than that at the current location, and wherein the data communication to or from the mobile station at the current location of the mobile station is delayed in the scheduling step when the available capacity at future locations is higher than that at the current location.

According to a second aspect of the present invention, the above-mentioned object is achieved by a telecommunication system for communicating data in a cellular telecommunication network (3) in which the available capacity is not uniformly distributed, comprising:

control means (2) communicating with a mobile station (1) and the cellular telecommunication network (3), for tracking the locations of the mobile station (1) moving in scheduling the data communication to or from the mobile station in accordance with the available capacity of the network at the current and future locations of the mobile station, wherein the data communication to or from the mobile station at the current location of the mobile station is prioritized by the control means when the available capacity at future locations is less than that at the current location, and wherein the data communication to or from the mobile station at the current location of the mobile station is delayed by the control means when the available capacity at future locations is higher than that at the current location.

Further features of the present invention are defined in the dependent claims.

According to the present invention, the Quality of Service provided for a mobile station communicating a significant amount of data can be maintained even if the mobile station moves in a network in which the available capacity is not uniformly distributed.

Furthermore, according to the present invention, network resources and radio efficiency can be optimized.

Moreover, according to the present invention, network capacities can be reserved for the users.

In the following the present invention will be described by way of a preferred embodiment thereof with reference to the accompanying drawings.

DESCRIPTION OF THE PREFERRED EMBODIMENT

Figure 1:
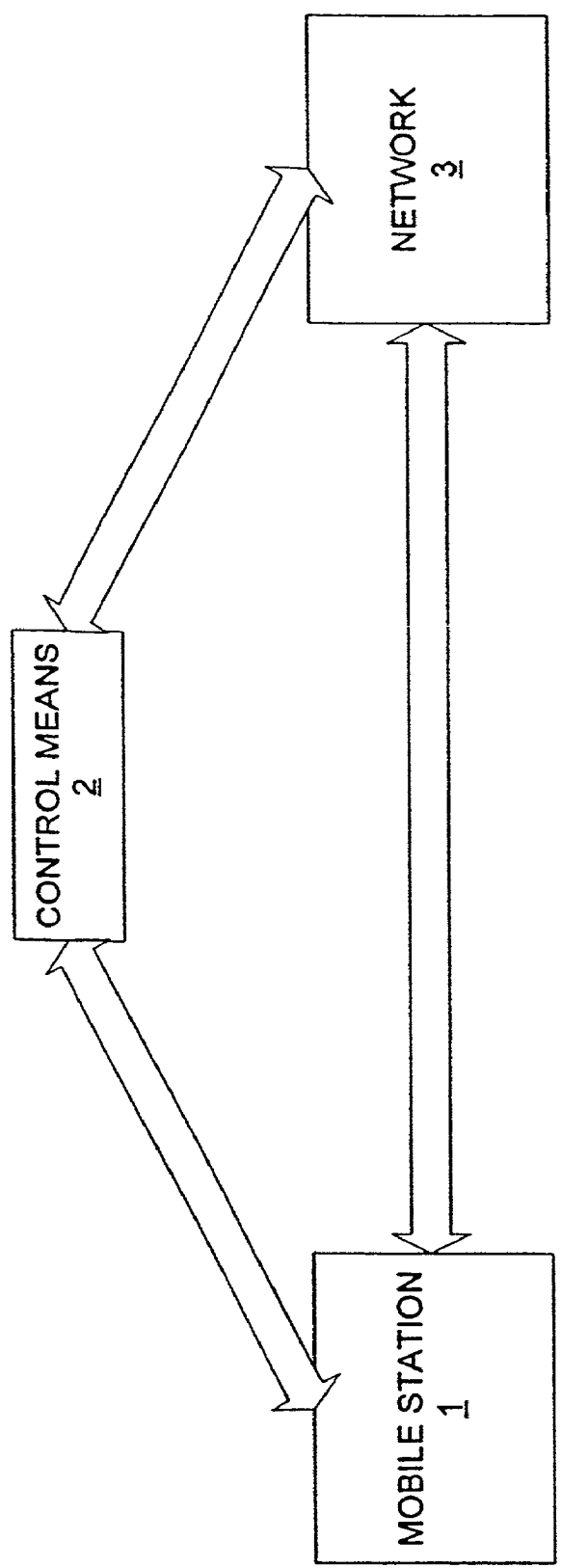
FIG. 1 shows a schematic block diagram of a communication system according to an embodiment of the present invention.

FIG. 1 shows a schematic block diagram of a communication system according to an embodiment of the present invention. As it is illustrated in FIG. 1, a mobile station 1 is connected to a network 3, and control means 2 communicate with the mobile station 1 and the network 3.

In FIG. 1, the control means 2 are shown as being located between the mobile station 1 and the network 3. However, the control means can also be partially or fully included in the network 3. Moreover, parts of the control means also can be incorporated in the mobile station 1.

The network 3 may be a cellular network formed of contiguous or overlapping cells, in which the available capacity is not uniformly distributed. There may be cells of different sizes, each grouped in layers, for example a macro layer consisting of macro cells and a micro layer consisting of micro cells within a macro cell.

When the mobile station 1 moves in the network, the cell that is serving the mobile station may change.

Moreover, when the mobile station 1 encounters a congested area in the network 3 which is formed of at least one cell having a traffic load which is expected to be above a predetermined threshold, the Quality of Service (QoS) provided for the mobile station 1 may have to be reduced.

It is noted, that an area in the network can comprise cells, groups of cells, geographical areas or network nodes.

In case data communication has to be performed by the mobile station 1 via the network 3 while the mobile station 1 is moving in the network having non-uniformly distributed available capacity, measures have to be taken in order to provide a reliable and optimized data transmission and reception by the mobile station 1.

According to the present invention, the control means 2 operate to provide a reliable and optimized data communication in the network 3. The operation of the control means 2 will be described in the following with respect to the flow charts shown in FIGS. 2 and 3.

Figure 2:
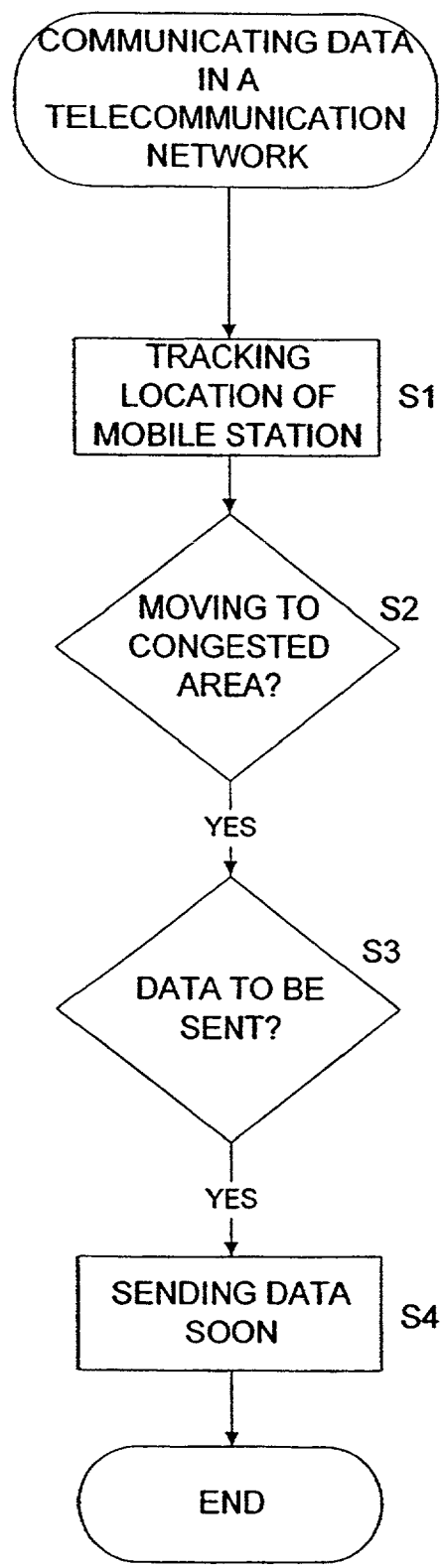
FIG. 2 shows a flow chart of an operation of control means according to the embodiment of the present invention.

According to the embodiment of the present invention shown in FIG. 2, the control means 2 keep track of the locations of the mobile station 1 moving in the network 3 (step S1). In case the control means 2 estimate that the mobile station is going to move to or enter a congested area in the network 3 (step S2), i.e. an area where the available capacity is decreased, and that there are data to be sent or received by the mobile station (step S3) the control means 3 prioritize the data communication to or from the mobile station 1 (step S4).

Alternatively, if the control means estimate that the mobile station is going to move to a less congested area it delays the data transmission or reception of the mobile station.

Figure 3:
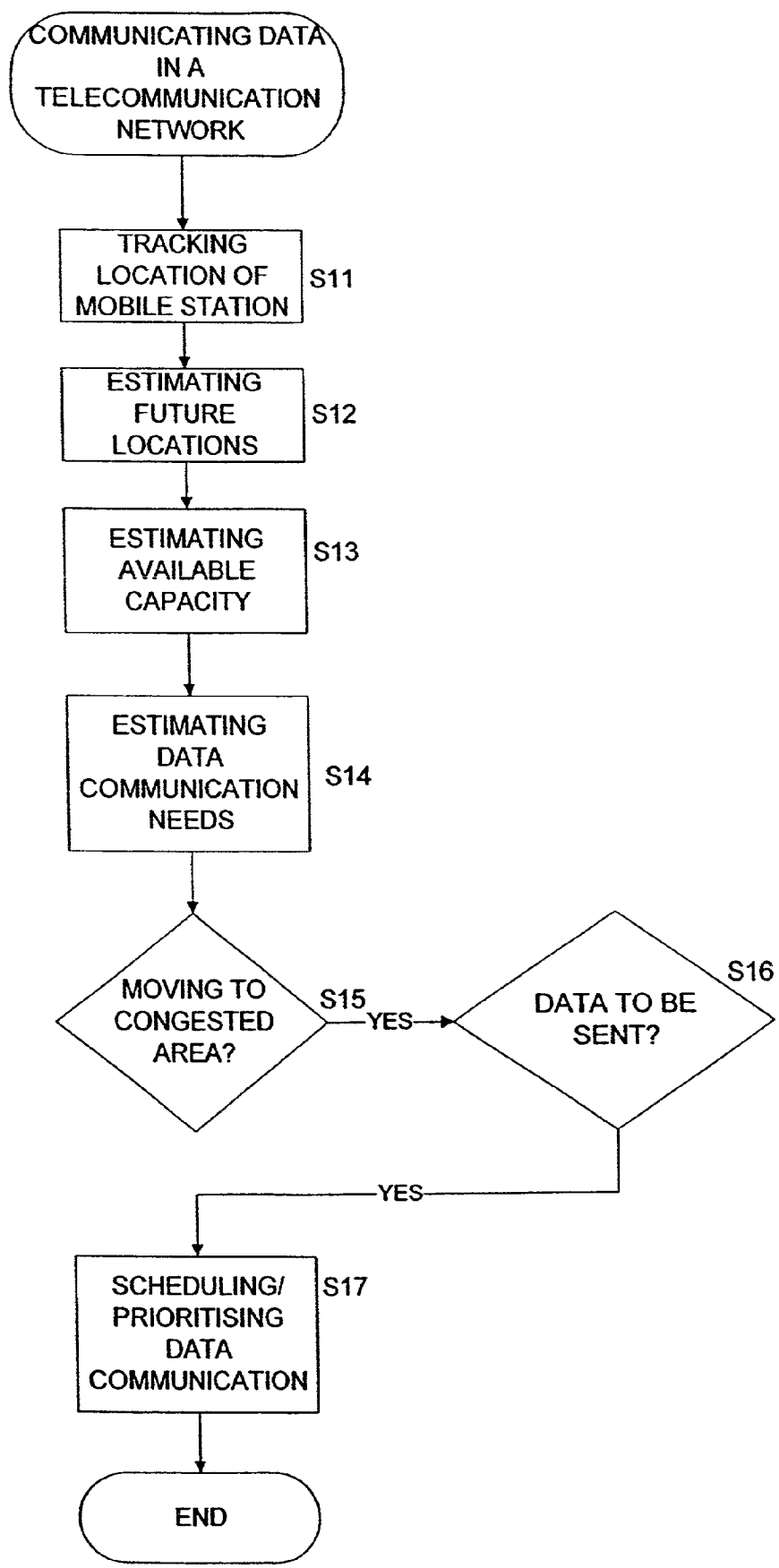
FIG. 3 shows a flow chart of a more detailed operation of the control means according to the present invention.

FIG. 3 shows a more detailed operation of the control means. According to FIG. 3, the control means 2 keep track of the locations of the mobile station 1 as it moves in the network 3 (step S11). In other words, the control means 2 always can estimate the location of the mobile station 1. In addition, the control means 2 estimate the moving direction or future locations and/or the velocity of the mobile station (step S12) on the basis of the tracked locations. Moreover, the future locations of the mobile station 1 can also be estimated on the basis of route information stored in the network 3. The route information comprises map information such as the road on which a user operating the mobile station is traveling or information about movement patterns of users or this specific user. In addition, the mobile station may be able to inform the network 3 or the control means 2 about its movement pattern either automatically or the subscriber will decide when the procedure will be started.

The control means 2 estimate the traffic load distribution in the vicinity of the mobile station and/or along the path on which the mobile station is moving (step S13). This can be done for example by evaluating a traffic load distribution present in the network 3. Furthermore, the mobile station 1 can execute measurements of the traffic load distribution in its vicinity and can inform the control means 2 about these measurements. The mobile station 1 can perform these measurements on the basis of traffic load distribution information provided by the network 3. Then, the control means 2 can use these measurements for estimating the available capacity of the network in the vicinity of the actual location of the mobile station.

The traffic load distribution can for example be measured on a cell-to-cell basis.

Furthermore, the control means 2 estimate data communication needs offered by the mobile station 1 (step S14). This estimation is made by checking buffers for buffering data transmitted to or from the mobile station 1 or by checking whether the mobile station 1 has indicated data communication needs. The estimation also can be based on previous data communication requirements or previous data communications and type of connection of the mobile station.

When the control means 2 estimate on the basis of the estimated moving direction or future locations and/or velocity of the mobile station 1 and on the basis of the estimated traffic load of a neighboring area that it is very likely that the mobile station 1 is moving towards or enters a congested area (step S15), and when the control means estimate that there are data communication needs of the mobile station, i.e. that the mobile station will transmit or receive data very soon (step S16), by detecting the state of buffers in the control means or an indicated data communication need, the control means 2 schedule the traffic to or from the mobile station 1 by giving the traffic to or from the mobile station 1 a priority, while the mobile station 1 is still in a less congested area of the network 3 (step S17).

The control means 2 can also instruct the mobile station 1 to perform the data communication quickly before entering the congested area.

Alternatively, the control means 2 can delay the data communication to or from the mobile station 1 in case it estimates that the mobile station 1 is going to enter a less congested area, i.e. an area having more capacity available than that area in which the mobile station is currently present.

The priority given to the mobile station 1 by the control means 2 may for example depend on the mobile or connection class of the mobile station 1 or the type of subscription.

The control means 2 are able to estimate a probability with which or when the mobile station is going to enter a congested area. That is, the control means 2 can estimate a probability with respect to movements of a subscriber. Moreover, the control means 2 are able to estimate relative or absolute changes in the available capacity, i.e. a probability of congestion in the network 3. If the estimated probability with respect to the movement of the subscriber or mobile station 1 exceeds a predetermined threshold and/or the relative or absolute change in the available capacity exceeds a threshold, the control means 2 may prioritize the data communication to or from the mobile station 1. These thresholds may be fixed or dynamic thresholds and may for example depend on network conditions. For example, the thresholds may be set in accordance with relative or absolute changes of the available capacity.

For example, according to a GPRS (General Packet Radio Service) network system, the control means 2 combine the features of a Serving GPRS Support Node (SGSN) and a Base Station Controller (BSC).

According to this example, the mobile station 1 connects to the network 3 via a Base Station System (BSS) comprising the BSC, which communicates with the SGSN.

The SGSN is able to track the location of the mobile station 1. The BSC which comprises buffers for buffering data transmitted to or from the mobile station 1 is able to estimate data communication needs of the mobile station 1 by monitoring filling conditions of its buffers. Moreover, the mobile station 1 executes measurements of neighbouring cells and the BSC can derive from these measurements whether the mobile station 1 is close to a congested cell or area. The BSC communicates the information about the data communication needs of the mobile station 1 and the moving direction and/or velocity of the mobile station 1 to the SGSN which knows the Quality of Service provided for the mobile station 1 and is able to prioritize or schedule the traffic to or from the mobile station 1.

The present invention is also applicable in the field of High Speed Circuit Switched Data (HSCSD) systems, UMTS (Universal Mobile Telecommunications System), BRAN (Broadband Radio Access Networks) and satellite communication systems.

In particular, the present invention is applicable to systems in which the user is stationary and is subjected to network location and capacity changes.

According to the present invention, the Quality of Service provided for a mobile station communicating a significant amount of data can be maintained even if the mobile station moves in a network in which the available capacity is not uniformly distributed.

Furthermore, according to the present invention, network resources and radio efficiency can be optimized.

While the invention has been described with reference to a preferred embodiment, the description is illustrative of the invention and is not to be construed as limiting the invention. Various modifications and applications may occur to those skilled in the art without departing from the scope of the invention as defined by the appended claims.

Having described the invention, what is claimed is:

1. A method, comprising:
    tracking the locations of a mobile station moving in a cellular telecommunication network in which the available capacity is not uniformly distributed, where a communication has been established between the mobile station and the cellular telecommunication network; and
    scheduling data communication to or from the mobile station in accordance with the available capacity of the network at both the current location and future locations of the mobile station,
    wherein the data communication to or from the mobile station at the current location of the mobile station is prioritized during scheduling when the available capacity at future locations is less than that at the current location, by giving traffic to or from the mobile station a priority while the mobile station is still in a less congested area of the cellular telecommunication network, and
    wherein the data communication to or from the mobile station at the current location of the mobile station is delayed during scheduling when the available capacity at future locations is higher than that at the current location.

2. The method according to claim 1, further comprising:
    estimating the future locations of the mobile station on the basis of the locations tracked during tracking.

3. The method according to claim 1, further comprising:
    estimating the future locations of the mobile station on the basis of route information about the moving mobile station provided by the mobile station.

4. The method according to claim 1, further comprising:
    estimating the future locations of the mobile station on the basis of movement patterns of the mobile station.

5. The method according to claim 1, further comprising:
    estimating the available capacity of the network at the current and future locations of the mobile station on the basis of an estimated current and future traffic load distribution of the network in an area in which and towards the mobile station is moving.

6. The method according to claim 5, wherein the area comprises cells, groups of cells, geographical areas and network nodes.

7. The method according to claim 1, further comprising:
    estimating the data communication needs of the mobile station.

8. The method according to claim 7, wherein the data communication to or from the mobile station is prioritized during scheduling when the data communication needs exceed a specific amount of data to be communicated.

9. The method according to claim 5, wherein the mobile station executes measurements of the traffic load distribution in the area and along the path in which it is moving, and wherein the available capacity of the current and future locations of the mobile station is estimated on the basis of the measurement results.

10. The method according to claim 7, further comprising:
    buffering data transmitted to and from the mobile station, wherein the estimation of the data communication needs of the mobile station is performed by monitoring the amount of buffered data.

11. The method according to claim 7, wherein the data communication needs of the mobile station are estimated on the basis of a transmission request from the mobile station.

12. The method according to claim 9, wherein the mobile station executes the measurements according to traffic load distribution information received from the network.

13. The method according to claim 1, wherein a plurality of mobile stations each having data communication needs are present in the network, and wherein the data communications of the plurality of mobile stations are scheduled in accordance with the available capacity of the network.

14. The method according to claim 13, wherein the data communications of the plurality of mobile stations are scheduled in accordance with estimated data communication needs of these mobile stations.

15. An apparatus, comprising:
a controller configured to track the locations of a mobile station moving in a cellular telecommunication network where a communication has been established between the mobile station and the cellular telecommunication network, and to schedule data communication to or from the mobile station in accordance with the available capacity of the network at both the current location and future locations of the mobile station,
wherein the data communication to or from the mobile station at the current location of the mobile station is prioritized by the controller when the available capacity at future locations is less than that at the current location, by giving traffic to or from the mobile station a priority while the mobile station is still in a less congested area of the cellular telecommunication network, and
wherein the data communication to or from the mobile station at the current location of the mobile station is delayed by the controller when the available capacity at future locations is higher than that at the current location.

16. The apparatus according to claim 15, wherein the controller is configured to estimate the future locations of the mobile station on the basis of the tracked locations.

17. The apparatus according to claim 15, wherein the controller is configured to estimate the future locations of the mobile station on the basis of route information about the moving mobile station provided by the mobile station.

18. The apparatus according to claim 15, wherein the controller is configured to estimate the future locations of the mobile station on the basis of movement patterns of the mobile station.

19. The apparatus according to claim 15, wherein the controller is configured to estimate the available capacity of the network at the current and future locations of the mobile station on the basis of an estimated current and future traffic load distribution of the network in the area in which and towards the mobile station is moving.

20. The apparatus according to claim 19, wherein the area comprises cells, groups of cells, geographical areas and network nodes.

21. The apparatus according to claim 15, wherein the controller is configured to estimate the data communication needs of the mobile station.

22. The apparatus according to claim 21, wherein the data communication to or from the mobile station is prioritized by the controller when the data communication needs exceed a specific amount of data to be communicated.

23. The apparatus according to claim 19, wherein the mobile station executes measurements of the traffic load distribution in the area and along the path in which it is moving, and wherein the controller is configured to estimate the available capacity of the current and future locations of the mobile station on the basis of the measurement results transmitted from the mobile station to the controller.

24. The apparatus according to claim 21, wherein the controller is configured to monitor buffers for buffering data transmitted to and from the mobile station, and estimate the data communication needs of the mobile station on the basis of the monitored amount of buffered data.

25. The apparatus according to claim 21, wherein the controller is configured to estimate the data communication needs of the mobile station on the basis of a transmission request from the mobile station.

26. The apparatus according to claim 23, wherein the mobile station executes the measurements according to traffic load distribution information received from the network.

27. The apparatus according to claim 15, wherein a plurality of mobile stations each having data communication needs are present in the network, and wherein the data communications of the plurality of mobile stations are scheduled in accordance with the available capacity of the network.

28. The apparatus according to claim 27, wherein the data communications of the plurality of mobile stations are scheduled in accordance with estimated data communication needs of these mobile stations.

29. An apparatus, comprising:
means for tracking the locations of a mobile station moving in a cellular telecommunication network where a communication has been established between the mobile station and the cellular telecommunication network, and for scheduling data communication to or from the mobile station in accordance with the available capacity of the network at both the current location and future locations of the mobile station,
wherein the data communication to or from the mobile station at the current location of the mobile station is prioritized by the means for tracking and for scheduling when the available capacity at future locations is less than that at the current location, by giving traffic to or from the mobile station a priority while the mobile station is still in a less congested area of the cellular telecommunication network, and
wherein the data communication to or from the mobile station at the current location of the mobile station is delayed by the means for tracking and for scheduling when the available capacity at future locations is higher than that at the current location.

30. The apparatus according to claim 29, wherein the means for tracking and for scheduling are for estimating the future locations of the mobile station on the basis of the tracked locations.

31. A system, comprising:
a controller configured to communicate with a mobile station and a cellular telecommunications network, to track the locations of the mobile station moving in the cellular telecommunications network where a communication has been established between the mobile station and the cellular telecommunication network, and to schedule data communication to or from the mobile station in accordance with the available capacity of the network at both the current location and future locations of the mobile station;
wherein the data communication to or from the mobile station at the current location of the mobile station is prioritized by the controller when the available capacity at future locations is less than at the current location, by giving traffic to or from the mobile station a priority when the mobile station is still in a less congested area of the cellular telecommunication network; and
wherein the data communication to or from the mobile station at the current location of the mobile station is delayed by the controller when the available capacity at future locations is higher than that at the current location.

* * * * *